US006084615A

United States Patent [19]

Mou et al.

[11] Patent Number: 6,084,615

[45] Date of Patent: Jul. 4, 2000

[54] STRUCTURE OF INKJET NOZZLE FOR INK CARTRIDGE

[75] Inventors: Tse-Chi Mou, Taipei Hsien; Arnold Chang-Mou Yang; Ta-Wei Hsueh, both of Hsinchu Hsien, all of Taiwan

[73] Assignee: Microjet Technology Co., Ltd., Hsinchu, Taiwan

[21] Appl. No.: 09/045,912

[22] Filed: Mar. 23, 1998

[51] Int. Cl.[7] .............................. G01D 15/18; B41J 2/14

[52] U.S. Cl. ................................................ 347/64; 347/63

[58] Field of Search ................................. 347/47, 56, 40, 347/59, 63, 64

[56] References Cited

U.S. PATENT DOCUMENTS

| | | | |
|---|---|---|---|
| 4,623,906 | 11/1986 | Chandrashekhar et al. | 347/47 |
| 4,894,664 | 1/1990 | Pan | 347/47 X |
| 4,922,265 | 5/1990 | Pan | 347/56 X |
| 5,493,320 | 2/1996 | Sandbach, Jr. et al. | 347/47 |
| 5,812,158 | 9/1998 | Murthy et al. | 347/47 X |

*Primary Examiner*—Susan S. Y. Lee

*Attorney, Agent, or Firm*—Oblon, Spivak, McClelland, Maier & Neustadt, P.C.

[57] ABSTRACT

An enduring and low-shock inkjet nozzle for an ink cartridge in an inkjet printer is provided. The inkjet nozzle includes a nozzle chip retaining thereon an ink obtained from the ink cartridge, a nozzle plate having thereon a plurality of ink-jetting holes, an energy converting layer converting an external electricity into a heat for vaporizing the ink to be jetted out from the ink-jetting holes, a protecting medium for preventing the energy converting layer from direct impact by the vaporized ink unsuccessfully jetted out of the ink-jetting holes, and a shock-absorbing medium mounted between the nozzle chip and the nozzle plate for absorbing a shock caused by the vaporized ink.

14 Claims, 2 Drawing Sheets

STRUCTURE OF INKJET NOZZLE FOR INK CARTRIDGE

FIELD OF THE INVENTION

The present invention relates to a nozzle, and more particularly to an inkjet nozzle used for an ink cartridge.

BACKGROUND OF THE INVENTION

The technology always gets developed with which we find no exception for the printer which is evolved from the dot-matrix one to the inkjet one, and further to the laser one. As the inkjet one is more economical than the laser one, the inkjet printer still plays an important role in nowaday market. The primary working principle of an inkjet printer is to control the jetting of fine vaporized ink-drops by vaporizing the ink through an electrical heating or by piezoelectrically extruding the ink. So far as the ink cartridge of the electrical heating type is concerned, there is provided with a heating plate being a resistor layer having a flat surface and protected by growing thereon a combined structure of ceramic layer and tough metal layer from being easily cracked. It is, however, imaginable that when the ink unsuccessfully jetted out of the ink-jetting holes backwardly impacts upon the combined structure and the resistor layer, they will be subject to continuous shock waves and apt to crack which will end the use life of the inkjet. It is therefore tried by the applicant to deal with the above situation encountered by the prior art.

SUMMARY OF THE INVENTION

It is therefore an object of the present invention to provide an enduring inkjet.

It is further an object of the present invention to provide an inkjet having a low shock.

According to the present invention, an inkjet nozzle for an ink cartridge in an inkjet printer includes a nozzle chip retaining thereon an ink obtained from the ink cartridge, a nozzle plate having thereon a plurality of ink-jetting holes and mounted on the nozzle chip, an energy converting layer provided on the nozzle chip and converting an external electricity into a heat for vaporizing the ink to be jetted out from the inkjetting holes, a protecting medium provided on the energy converting layer for preventing the energy converting layer from a direct impact by a vaporized ink unsuccessfully jetted out of the ink-jetting holes, and a shock-absorbing medium mounted between the nozzle chip and the nozzle plate for absorbing a shock caused by the vaporized ink. Perferably the energy converting layer is a resistor layer, the protecting layer is heat-resistant, and/or the shock-absorbing medium is made of a polymer.

Preferably the present ink nozzle further includes a guiding wall mounted between the nozzle plate and the energy converting layer for guiding the vaporized ink to be jetted out of the ink-jetting holes. The guiding wall can be cylindrical or have a rectangular crosssection.

Certainly, the protecting medium can have an opening for inserting therein the shock-absorbing medium, and the energy converting layer can have a hole communicating with the opening. The protecting medium can include a metal layer and a ceramic layer either one or both of which can be provided with the opening which can be optionally centrally provided on the protecting medium to be aligned with or skewedly aligned with one of said ink-jetting holes each of which can have an inwardly flared portion.

The present invention may best be understood through the following descriptions with reference to the accompanying drawings, in which:

DETAILED DESCRIPTION OF THE PREFERRED EMBODIMENTS

Figure 1:
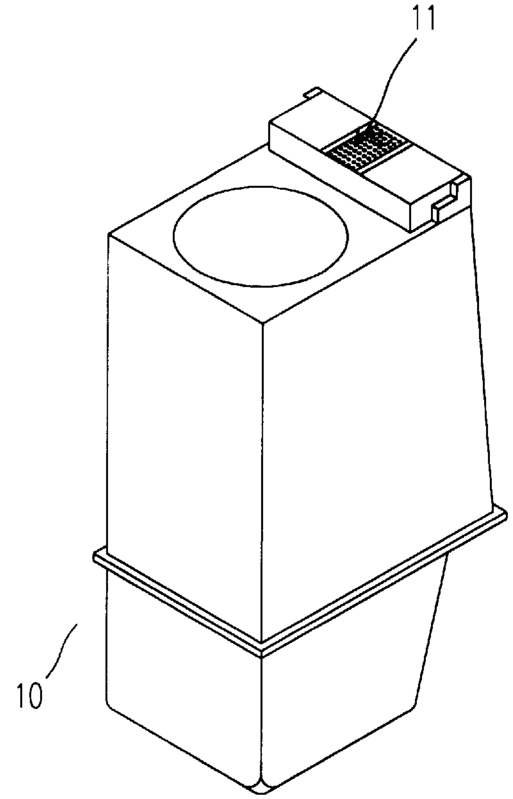
FIG. 1 is a perspective view showing a preferred embodiment of an inkjet nozzle for an ink cartridge according to the present invention.
Figure 2:
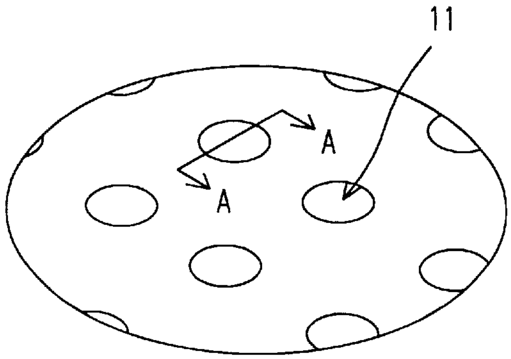
FIG. 2 is an enlarged partial view showing a nozzle plate in an inkjet nozzle in FIG. 1.
Figure 3:
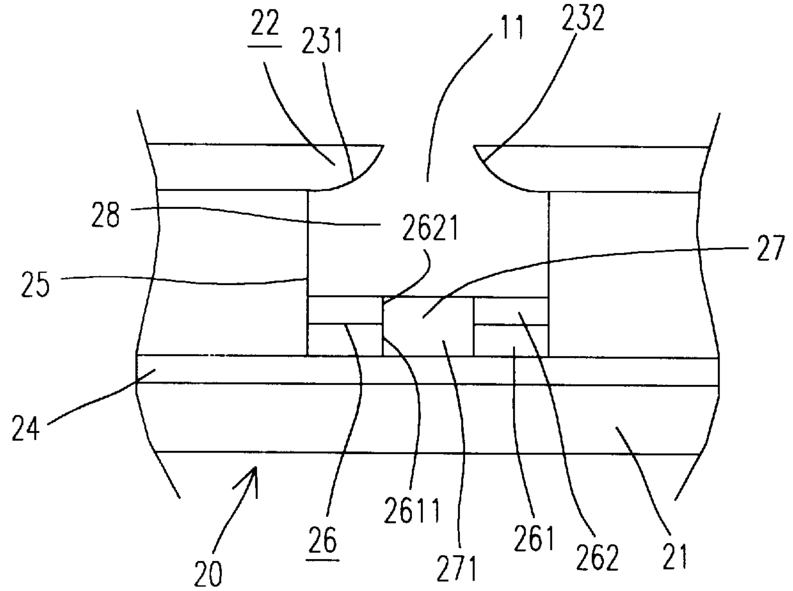
FIG. 3 is a fragmentarily crosssectional view showing an inkjet nozzle in FIG. 1 taken along line A—A in FIG. 2.

Referring now to FIGS. 1–3, there is shown a preferred embodiment of an inkjet nozzle 20 for an ink cartridge 10 in an inkjet printer (not shown) according to the present invention, which includes a nozzle chip 21 for retaining thereabove or thereon an ink obtained from ink cartridge 10, a nozzle plate 22 having thereon an inwardly flared portion 231 and a plurality of, e.g. 50 ink-jetting holes 1 1 and mounted on nozzle chip 21, an energy converting layer 24 provided on nozzle chip 21 and converting an external electricity into a heat for vaporizing the ink to be jetted out from ink-jetting holes 11, a protecting medium 26 provided on energy converting layer 24 for preventing energy converting layer 24 from a direct impact by the vaporized ink unsuccessfully jetted out of ink-jetting holes 11, and a shock-absorbing medium 271 mounted between nozzle chip 21 and nozzle plate 22 for absorbing a shock caused by the vaporized ink unsuccessfully jetted out of ink-jetting holes 11. According to the momentum conservative principle, the vaporized ink stopped by inwardly flared portion 231 will backwardly impact upon the spot where it is rebounded which will crack energy converting layer 24 and/or protecting layer 26 which will be obviated or alleviated by the provision of shock-absorbing medium 271 according to the present invention.

Energy converting layer 24 can be a resistor layer for vaporizing the ink to be jetted out of ink-jetting holes 11. Protecting layer 26 can be hard and heat-resistant and can be provided with an opening 27 for inserting therein shock-absorbing medium 271 which can be made of a polymer. The present ink nozzle can be further provided with a guiding wall 25 mounted between nozzle plate 22 and energy converting layer 24 for confining and guiding therein the vaporized ink to be jetted out of ink-jetting holes 11. Guiding wall 25, nozzle plate 22 and protecting layer 26 form thereamong an ink tank 28. Guiding wall 25 can be cylindrical or have a rectangular crosssection.

Figure 4:
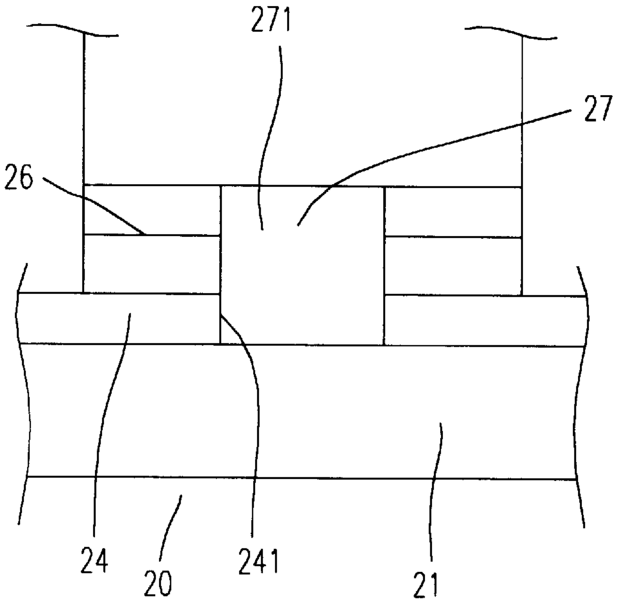
FIG. 4 is a fragmentarily crosssectional view showing a further preferred embodiment of an inkjet nozzle in FIG. 1.
Figure 5:
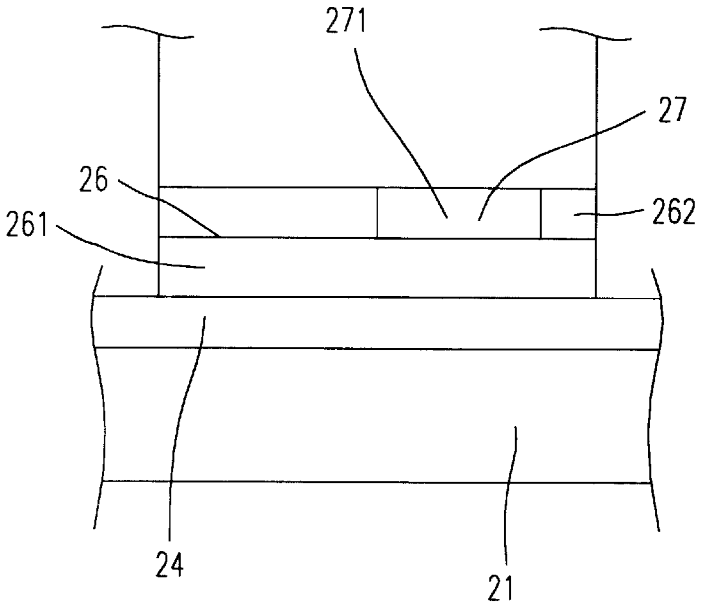
FIG. 5 is a fragmentarily crosssectional view showing another preferred embodiment of an inkjet nozzle in FIG. 1.

Protecting medium 26 includes a tough metal layer 262 having a hole 2621 and a ceramic layer 261 having a hole 2611. Holes 2621, 2611 form opening 27. Certainly, energy converting layer 24 can also be provided with a hole 241, as shown in FIG. 4, communicating with opening 27 which can also be circular or rectangular. Opening 27 can be optionally centrally provided on protecting medium 26 and/or energy converting layer 24 to be aligned with or skewedly aligned with one of ink-jetting holes 11, as shown in FIG. 5. Normally, a centrally provided opening 27 inserting therein shock-absorbing medium 271 has a better shock-absorbing effect. It should also be possible that the hole (2611, 241) for inserting therein shock-absorbing medium 271 is merely provided on ceramic layer 261 and/or energy converting layer 24. Certainly, it should also be possible that the shock-absorbing medium is alternatively provided on the combined structure of the ceramic layer and the metal layer having no opening.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. An inkjet nozzle for an ink cartridge in an inkjet printer comprising:

a nozzle chip for retaining thereon an ink obtained from said ink cartridge;

a nozzle plate having thereon a plurality of inkjetting holes and mounted on said nozzle chip;

an energy converting layer provided on said nozzle chip and converting an external electricity into a heat for vaporizing said ink to be jetted out from said ink-jetting holes;

a protecting medium provided on said energy converting layer for preventing said energy converting layer from a direct impact by a vaporized ink unsuccessfully jetted out of said inkjetting holes; and a shock-absorbing medium mounted between said nozzle chip and said nozzle plate for absorbing a shock caused by said vaporized ink.

2. An ink nozzle according to claim 1 wherein said energy converting layer is a resistor layer.

3. An ink nozzle according to claim 1 wherein said protecting medium is heat-resistant.

4. An ink nozzle according to claim 1 wherein said shock-absorbing medium is made of a polymer.

5. An ink nozzle according to claim 1, further comprising a guiding wall mounted between said nozzle plate and said energy converting layer for guiding said vaporized ink to be jetted out of said ink-jetting holes.

6. An ink nozzle according to claim 5 wherein said guiding wall is cylindrical.

7. An ink nozzle according to claim 5 wherein said guiding wall has a rectangular crosssection.

8. An ink nozzle according to claim 1 wherein said protecting medium has an opening for inserting therein said shock-absorbing medium.

9. An ink nozzle according to claim 8 wherein said energy converting layer has a hole communicating with said opening.

10. An ink nozzle according to claim 8 wherein said protecting medium includes a metal layer and a ceramic layer provided with said opening.

11. An ink nozzle according to claim 8 wherein said protecting medium includes a ceramic layer having a first hole and a metal layer having a second hole, and said first and said second holes form said opening.

12. An ink nozzle according to claim 8 wherein said opening is centrally provided on said protecting medium to be aligned with one of said ink-jetting holes.

13. An ink nozzle according to claim 8 wherein said opening is provided on said protecting medium to be skewedly aligned with one of said ink-jetting holes.

14. An ink nozzle according to claim 1 wherein each of said ink-jetting holes has an inwardly flared portion.

* * * * *